(12) United States Patent
Ryan et al.

(10) Patent No.: US 7,784,103 B2
(45) Date of Patent: Aug. 24, 2010

(54) METHOD AND APPARATUS FOR STORING COPY PROTECTION INFORMATION SEPARATELY FROM PROTECTED CONTENT

(75) Inventors: John O. Ryan, Woodside, CA (US); Ronald Quan, Cupertino, CA (US); James H. Salter, Santa Clara, CA (US)

(73) Assignee: Rovi Solutions Corporation, Santa Clara, CA (US)

( * ) Notice: Subject to any disclaimer, the term of this patent is extended or adjusted under 35 U.S.C. 154(b) by 678 days.

(21) Appl. No.: 10/968,487

(22) Filed: Oct. 19, 2004

(65) Prior Publication Data
US 2006/0085863 A1    Apr. 20, 2006

(51) Int. Cl.
*G06F 7/04*     (2006.01)

(52) U.S. Cl. ................. 726/30; 380/201; 380/216; 380/221; 380/227; 713/165; 713/193; 726/17

(58) Field of Classification Search ............. 726/30
See application file for complete search history.

(56) References Cited

U.S. PATENT DOCUMENTS

| | | | |
|---|---|---|---|
| 4,631,603 A | | 12/1986 | Ryan |
| 4,914,694 A | | 4/1990 | Leonard et al. |
| 5,194,965 A | | 3/1993 | Quan et al. |
| 5,315,448 A | * | 5/1994 | Ryan ............ 360/60 |
| 5,574,787 A | * | 11/1996 | Ryan ............ 380/201 |
| 5,799,081 A | * | 8/1998 | Kim et al. ............ 380/203 |
| 5,953,417 A | * | 9/1999 | Quan ............ 380/203 |
| 6,381,747 B1 | * | 4/2002 | Wonfor et al. ........ 725/104 |
| 6,404,889 B1 | * | 6/2002 | Ryan et al. ........ 380/201 |
| 6,523,113 B1 | * | 2/2003 | Wehrenberg ........ 713/176 |
| 6,836,549 B1 | * | 12/2004 | Quan et al. ........ 380/221 |
| 6,980,653 B1 | * | 12/2005 | Sako et al. ........ 380/203 |

(Continued)

FOREIGN PATENT DOCUMENTS

EP    0735752    * 10/1996

(Continued)

OTHER PUBLICATIONS

"International Search Report and Written Opinion for Application No. PCTUS0536970", (Mar. 28, 2007),9 pgs.

(Continued)

*Primary Examiner*—Matthew B Smithers
*Assistant Examiner*—Shewaye Gelagay
(74) *Attorney, Agent, or Firm*—James H. Salter; Andy T. Pho

(57) ABSTRACT

A copy protection system and method enabling storage of copy protection information separately from protected content is disclosed. One embodiment includes a mechanism for playing a recording medium, the recording medium having stored thereon a digital content file and a copy protection information file, the mechanism producing a digital content signal from the digital content file and a copy protection signal from the copy protection file; a digital to analog converter operatively connected to the mechanism for converting the digital content signal to an analog signal; a copy protection detector connected to the mechanism for detecting a copy protection trigger present in the digital content signal; and a signal modifier connected to the copy protection detector for modifying the analog signal to include the copy protection signal in response to detection of the copy protection trigger.

9 Claims, 8 Drawing Sheets

U.S. PATENT DOCUMENTS

| | | | |
|---|---|---|---|
| 7,050,698 B1 | 5/2006 | Quan | |
| 2004/0054894 A1 | 3/2004 | Lambert | |
| 2004/0168075 A1* | 8/2004 | Suh et al. | 713/193 |
| 2004/0179691 A1* | 9/2004 | Hori et al. | 380/277 |
| 2006/0110131 A1* | 5/2006 | Okauchi et al. | 386/95 |
| 2008/0292269 A1 | 11/2008 | Ryan et al. | |

FOREIGN PATENT DOCUMENTS

| | | |
|---|---|---|
| EP | 0735752 A2 | 10/1996 |
| EP | 0969462 A1 | 1/2000 |
| EP | 1298655 A2 | 4/2003 |
| JP | 2004-007452 | 1/2004 |
| TW | 591651 | 6/2004 |
| TW | 222561 | 10/2004 |
| WO | WO 97/43853 * | 11/1997 |
| WO | WO-2004081719 A2 | 9/2004 |

OTHER PUBLICATIONS

U.S. Appl. No. 11/228,757, Non-Final Office Action mailed Jan. 28, 2009, 16 pgs.

Taiwanese Application Serial No. 094136598, Office Action mailed Apr. 26, 2007, 7 pgs.

"U.S. Appl. No. 11/228,757, Response filed May 7, 2009 to Non Final Office Action mailed Jan. 28, 2009", 11 pgs.

"U.S. Appl. No. 12/187,191, Preliminary Amendment filed Sep. 9, 2008", 12 pgs.

"European Application Serial No. 05812506.3, Examination Report mailed Mar. 10, 2009", 19 pgs.

"European Application Serial No. 05812506.3, Office Action mailed Jun. 15, 2009", 8 pgs.

"U.S. Appl. No. 11/228,757, Final Office Action mailed Aug. 10, 2009", 18 Pgs.

"U.S. Appl. No. 11/228,757, Non-Final Office Action mailed Jan. 25, 2010", 19 pgs.

"U.S. Appl. No. 11/228,757, Response filed Nov. 10, 2009 to Final Office Action mailed Aug. 10, 2009", 10 pgs.

"European Applicaion Serial No. 05812506.3, Office Action mailed Dec. 9, 2009", 4 pgs.

* cited by examiner

METHOD AND APPARATUS FOR STORING COPY PROTECTION INFORMATION SEPARATELY FROM PROTECTED CONTENT

BACKGROUND

1. Field

Embodiments of the invention relate to the field of analog and digital copy protection; and more specifically, to the field of copy protection of content stored on digital recordable media.

2. Description of the Related Art

Various well known copy protection schemes for video signals include those disclosed in U.S. Pat. No. 4,631,603, by John O. Ryan, Dec. 23, 1986 and assigned to Macrovision Corporation, directed to modifying an analog video signal to inhibit making of acceptable video recordings therefrom. The '603 patent discloses adding a plurality of pulse pairs to the otherwise unused lines of a video signal vertical blanking interval, each pulse pair being a negative-going pulse followed closely by a positive-going pulse. The effect is to confuse AGC (automatic gain control) circuitry of a VCR (video cassette recorder) recording such a signal, so that the recorded signal is un-viewable due to the presence of an excessively dark picture when the recorded signal is played back.

Another analog video protection scheme is disclosed in U.S. Pat. No. 4,914,694 issued Apr. 3, 1990, to Leonard, and assigned to Eidak Corporation: The Eidak system (see Eidak Abstract) increases or decreases the length of each video field from the standard length, either by changing the time duration of the respective horizontal line intervals in each field while keeping a constant, standard number of lines per frame, or by changing the number of horizontal line intervals which constitute a frame while maintaining the standard duration of each line interval.

These video protection systems modify the video signal to be recorded (for example, on tape, magnetic disk, optical disk, or other recordable media) or to be broadcast (for example, protected pay-per-view (PPV) television programs) and to make viewable copying by ordinary VCRs or other recordable media difficult or impossible. When a video tape, or the like, on which is recorded the copy protected video signal is played back for viewing using a VCR or similar playback device, the copy protection process is essentially transparent, i.e., it does not interfere with viewing the originally recorded content. However, any attempt made to copy the video signal from the tape using a second VCR to record the output of the first (playback) VCR yields a picture degraded to some extent, depending on the efficacy of the particular copy protection system. These conventional video copy protection systems protect only analog video signals.

Also well known are digital video recorders, which both record and play back digitally. The advantage to the user of a digital recorder is that so long as the signals are recorded and played back in the digital domain, each successive generation of copies is without any significant reduction in picture quality, unlike the case with conventional analog recording technology.

Many consumer products today include both digital and analog inputs and outputs. Some of these systems have the capability to record and playback digital signals, while still having analog output capabilities. Thus, these systems have the capability to internally convert input analog signals into digital signals, and play back the digital signals as an analog video stream from a digital storage device. A digital versatile disk (DVD) player is one example of such a consumer device that retains digital video signals and can output a corresponding analog video stream. During playback, the digital data stream from an optical disk, for example, may be available both as a digital signal for display by a digital television set or converted within the device to a conventional analog video output signal (such as the NTSC signal used in the United States, or PAL or SECAM used elsewhere).

Because digital video systems are capable of high fidelity reproduction, which in turn facilitates high quality copying, it is important that such devices for consumer use be designed to inhibit or discourage unauthorized recording. For instance, it is important to prevent use of recorders for illegally duplicating copyrighted video material, and also to prevent playing back of such illegally duplicated material.

U.S. Pat. No. 5,315,448 (the '448 patent), by John O. Ryan, describes a hybrid digital and analog recorder that records digitally and provides copy protection in both the digital and analog domains. For externally supplied analog video, the recorder detects the presence of copy protection and in response disables recording. For externally supplied digital video, both anti-copy bits and serial copy protection bits are detected to respectively (1) disable recording and (2) prevent later copying by a second digital recorder. For playing back of recorded material, the presence of anti-copy bits is detected in the digital playback video, and the digital playback video upon being converted to an analog signal is modified by an analog video copy protection process. In another embodiment of the '448 invention, analog or digital source video material (either prerecorded or from an external source) is provided with a copy protection flag or trigger. Detection of the flag by a playback device results in modification of the played back standard video signal with an analog copy protection process. This embodiment is suitable for playback devices where the source video cannot be copy protected, but a standard (NTSC) video signal is provided from a played-back recording.

The analog video copy protection process described in the '448 patent includes the use of an ACP (anti-copy process) signal generator, such as an embodiment described in U.S. Pat. No. 4,631,603. This ACP signal generator generates an analog video anti-copy signal. The ACP signal generator then adds this analog anti-copy signal to the output signal of a digital to analog converter, which has converted the digital video output signal from a DVD, for example, to an analog (for example, NTSC) signal. Alternatively, the ACP signal generator can be implemented as shown in above-referenced U.S. Pat. No. 4,914,694 for modifying the "TV signal source". It will be apparent to those of ordinary skill in the art that other ACP signal generator implementations can be used. Thus, using the '448 invention, the analog (NTSC) video signal presented at an analog output terminal is an analog video signal modified by the analog anti-copy process. This prevents the making of acceptable video recordings on existing analog recording devices from the signal provided from the pre-recorded video signal.

Although the '448 patent describes an effective analog copy protection system, it would be beneficial to separate out the particular analog anti-copy process from the hardware that actually modifies the analog video signal for output to a rendering or recording device. By separating the anti-copy process from the signal modification hardware, the system would achieve a level of flexibility and configurability not present in systems today.

BRIEF DESCRIPTION OF THE DRAWINGS

The present invention is illustrated by way of example and not limitation in the figures of the accompanying drawings, in which.

DETAILED DESCRIPTION

A copy protection system and method enabling storage of copy protection information separately from protected content is disclosed. In the following detailed description, numerous specific details are set forth in order to provide a thorough understanding of the present invention. However, it will be apparent to one of ordinary skill in the art that these specific details need not be used to practice the present invention. In other circumstances, well-known structures, circuits, processes and interfaces have not been shown or described in detail in order not to unnecessarily obscure the present invention.

Figure 1:
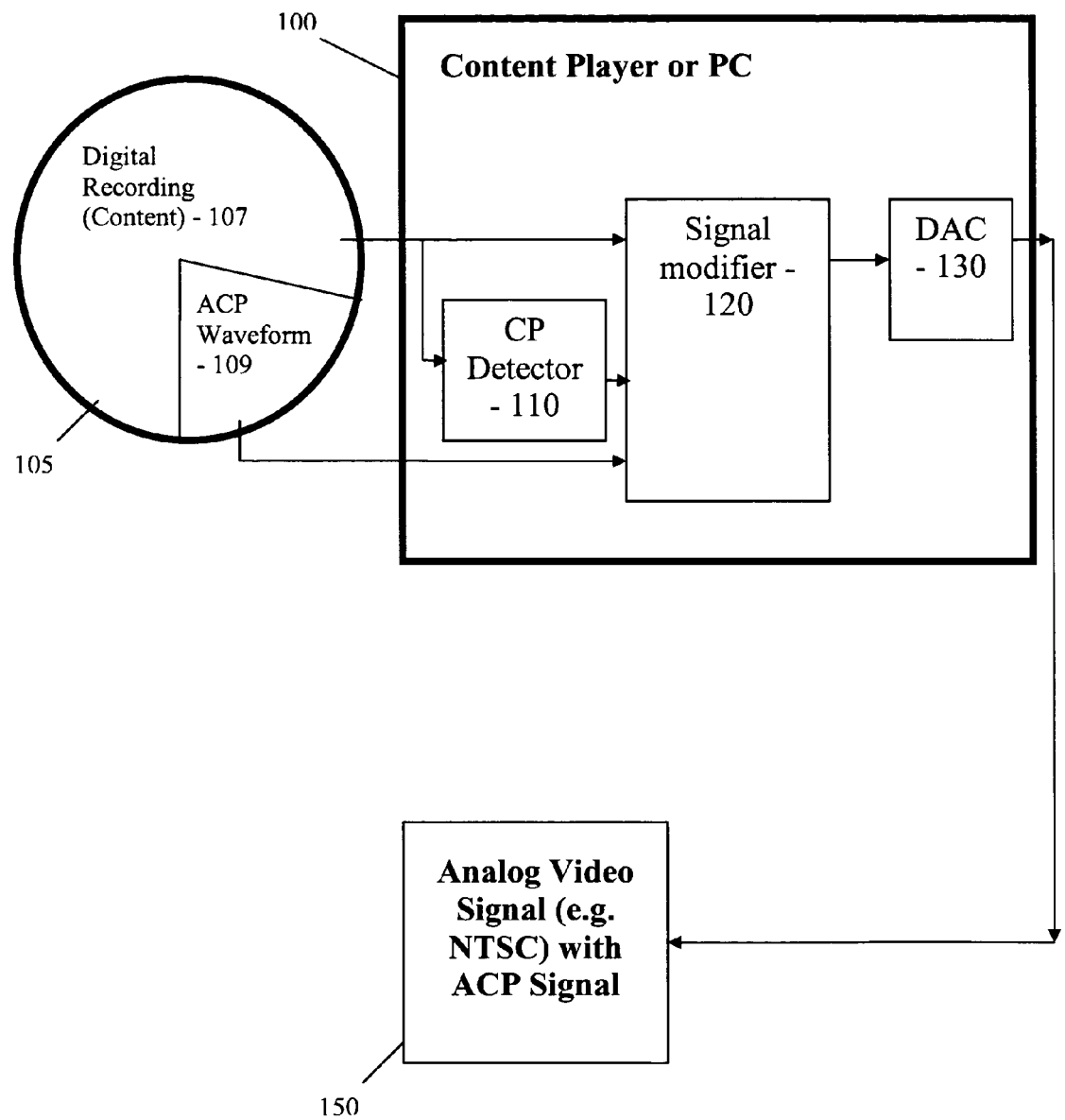
FIG. 1 is a block diagram of a system in accordance with a first embodiment.

Referring now to FIG. 1, a block diagram illustrates one embodiment of the present invention. FIG. 1 shows a mechanism 100 for playing a digital recording medium 105. One example of such a mechanism is a DVD player or a conventional personal computer. The recording medium 105 (e.g. a DVD disk) has stored thereon a digital content file 107 and a copy protection information file 109. The digital content file 107 represents a conventional digitized work, such as a video movie. The copy protection information file 109 represents one of several alternative embodiments of a set of information used to implement an analog copy protection process, such as the process described above in relation to the '603, '694, and '448 patents. In one embodiment, the file 109 is a digitized analog copy protection waveform that can be conveniently added to a digital content signal produced from the digital content file 107. For example, file 109 can represent a horizontal/vertical synch structure for a conventional television set or video monitor. Alternatively, file 109 can represent an entire vertical blanking interval line for a conventional television set or video monitor. Other equivalent implementations of the copy protection information file 109 will be apparent to those of ordinary skill in the art in light of this disclosure. Further, the copy protection information in file 109 can be encoded in a number of conventional ways. In one embodiment, the copy protection information in file 109 can be a raw digitized waveform. In other embodiments, the copy protection information in file 109 can be digitized data in combination with a metadata portion that specifies the particular type of encoding used. In still other embodiments, copy protection information in file 109 can be a mathematical model representation or a programmatic representation that defines the static and dynamic elements of the copy protection waveform.

The mechanism 100 for playing the recording medium 105 produces a conventional digital content signal from the digital content file 107. This digital content signal is provided as an input to a digital-to-analog converter (DAC) 130 through a signal modifier 120. The DAC 130 receives the digital content signal from signal modifier 120 and produces a corresponding analog content signal (e.g. an NTSC video signal).

Prior to conversion to the analog domain, the digital content signal is also provided as an input to a Copy Protection (CP) detector 110, as shown in FIG. 1. CP detector 111 decodes a copy protection trigger encoded into the digital content. The '448 patent summarized above describes an implementation of a CP detector 110 for detecting copy protection trigger bits in a digital content signal. The output of CP detector 110 is connected to signal modifier 120. Signal modifier 120 is used to modify the digital content signal to add in a copy protection signal for output to DAC 130, if the CP detector 110 detects the presence of a copy protection trigger in the digital content. If the CP detector 110 does not detect the copy protection trigger, the digital content signal is passed to DAC 130 in an unmodified form. If the copy protection trigger is detected, the signal modifier 120 obtains the copy protection signal from the copy protection file 109 resident on digital media 105. The signal modifier 120 modifies/augments the digital content signal with the copy protection signal and outputs a modified signal to DAC 130, which produces a modified analog output signal 150 with an embedded copy protection signal. In a manner similar to the technology described the '603, '694, and '448 patents, the modified analog signal 150 can be used to prevent unauthorized copying of the analog signal, thereby protecting the corresponding content. In one embodiment, the analog output signal is a conventional NTSC video signal with an embedded analog copy protection (ACP) signal.

Figure 2:
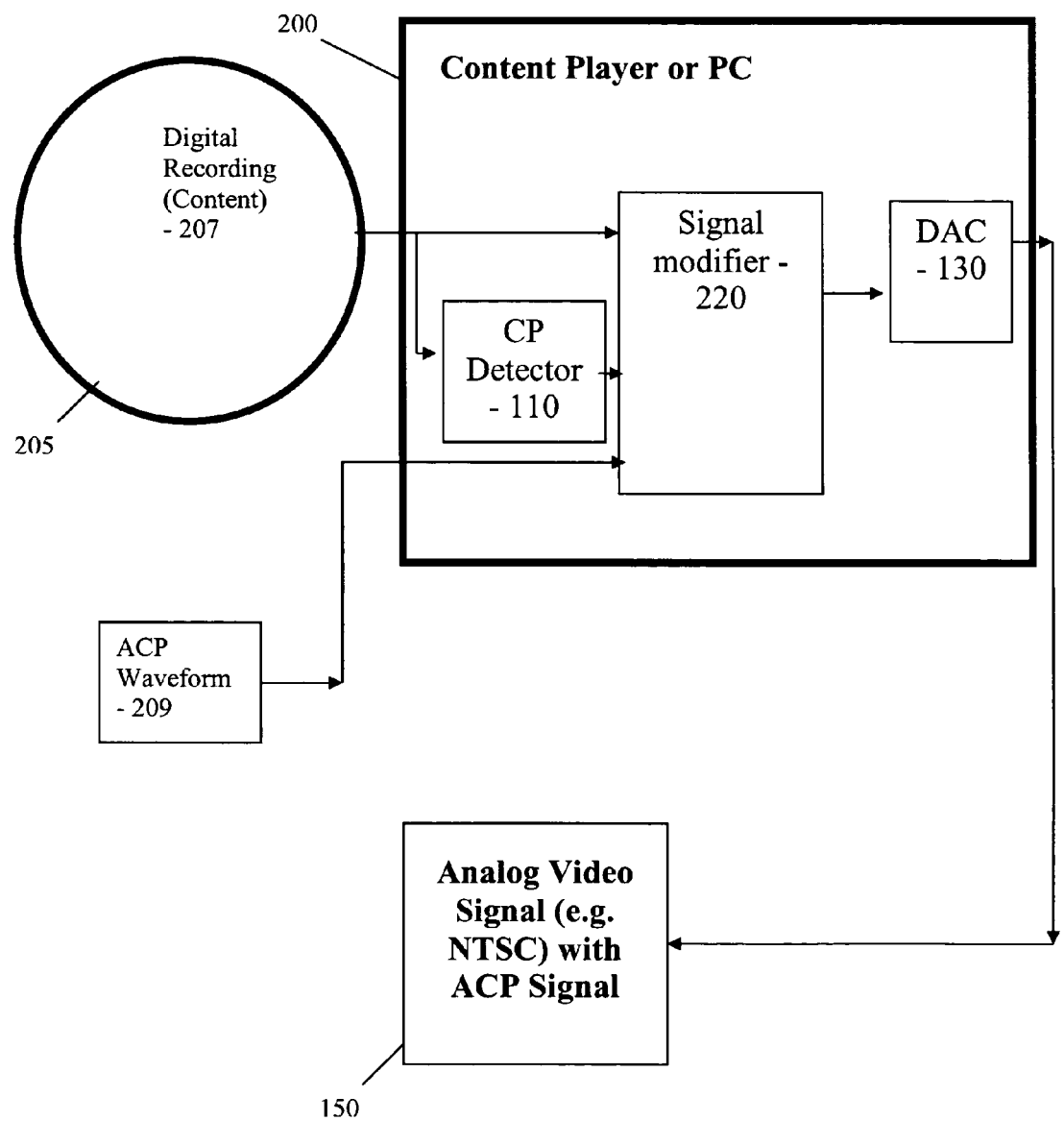
FIG. 2 is a block diagram of a system in accordance with a second embodiment.

Referring now to FIG. 2, an alternative embodiment is illustrated. As shown in FIG. 2, the embodiment includes a mechanism 200 for playing a digital recording medium 205. Similar to the implementation shown in FIG. 1, one example of such a mechanism is a DVD player or a personal computer. The recording medium 205 has stored thereon a digital content file 207. In contrast to the embodiment shown in FIG. 1, the copy protection information file 209 is not embodied on digital media 205. Rather, the copy protection file 209 is stored separately on either a permanent or removable memory device accessible to mechanism 200. Various conventional memory devices may be used to retain the copy protection file 209. For example, a flash memory or other type of semiconductor memory can be inserted into mechanism 200. A conventional removable card with a magnetic strip or electric interface can also be used. Using any of these various conventional means, the copy protection file 209 can be accessed by the signal modifier 220 and used to modify the digital content signal in the manner described above in relation to FIG. 1. The copy protection file 209 can take any of the forms described above in relation to FIG. 1. The embodiment shown in FIG. 2 has the advantage that the digital media 205 does not need to be modified to retain the copy protection file. In all other respects, the embodiment shown in FIG. 2 operates similarly to the embodiment shown in FIG. 1 and produces the modified analog output signal 150, if CP detector 110 detects the copy protection trigger in the digital content signal.

Figure 3:
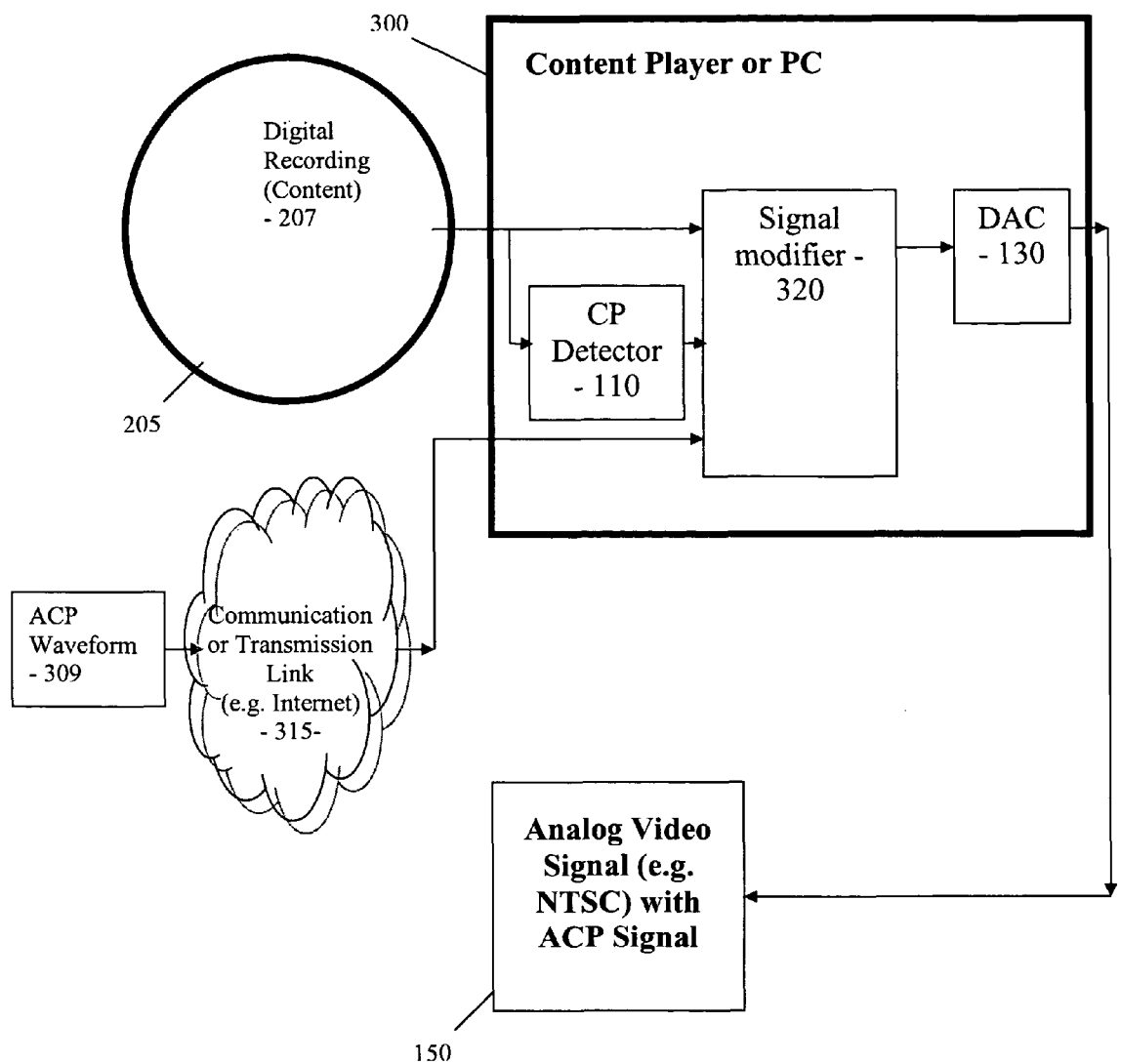
FIG. 3 is a block diagram of a system in accordance with a third embodiment.

Referring now to FIG. 3, another alternative embodiment is illustrated. As shown in FIG. 3, the embodiment includes a mechanism 300 for playing a digital recording medium 205. Similar to the implementation shown in FIG. 1, one example of such a mechanism is a DVD player or a personal computer. The recording medium 205 has stored thereon a digital content file 207. In contrast to the embodiments shown in FIGS. 1 and 2, the copy protection information file 309 is not embodied on digital media 205 nor stored locally on a memory device directly accessible to mechanism 300. Rather, the copy protection file 309 is stored remotely from the mechanism 300 and made accessible via a conventional network connection 315. Using conventional techniques, the copy protection file 309 can be obtained via a communication or transmission link with a network connection 315 (e.g. the Internet) and provided as an input to signal modifier 320. In the manner described above, the copy protection file 309 can be accessed by the signal modifier 320 and used to modify the digital content signal in the manner described above in relation to FIG. 1. The copy protection file 309 can take any of the forms described above in relation to FIG. 1. In a typical embodiment, the copy protection trigger bits in the digital content signal detected by CP detector 110 can also be used to trigger the mechanism 300 to require access to the copy protection file 309 via Internet 315. In this manner, the playback of the content 207 could be inhibited until the file 309 is obtained. The embodiment shown in FIG. 3 has the advantage that the digital media 205 does not need to be modified to retain the copy protection file. Further, the copy protection file 309 can be remotely stored and thus can be updated more readily. In all other respects, the embodiment shown in FIG. 3 operates similarly to the embodiment shown in FIG. 1 and produces the modified analog output signal 150, if CP detector 110 detects the copy protection trigger in the digital content signal.

Figure 4:
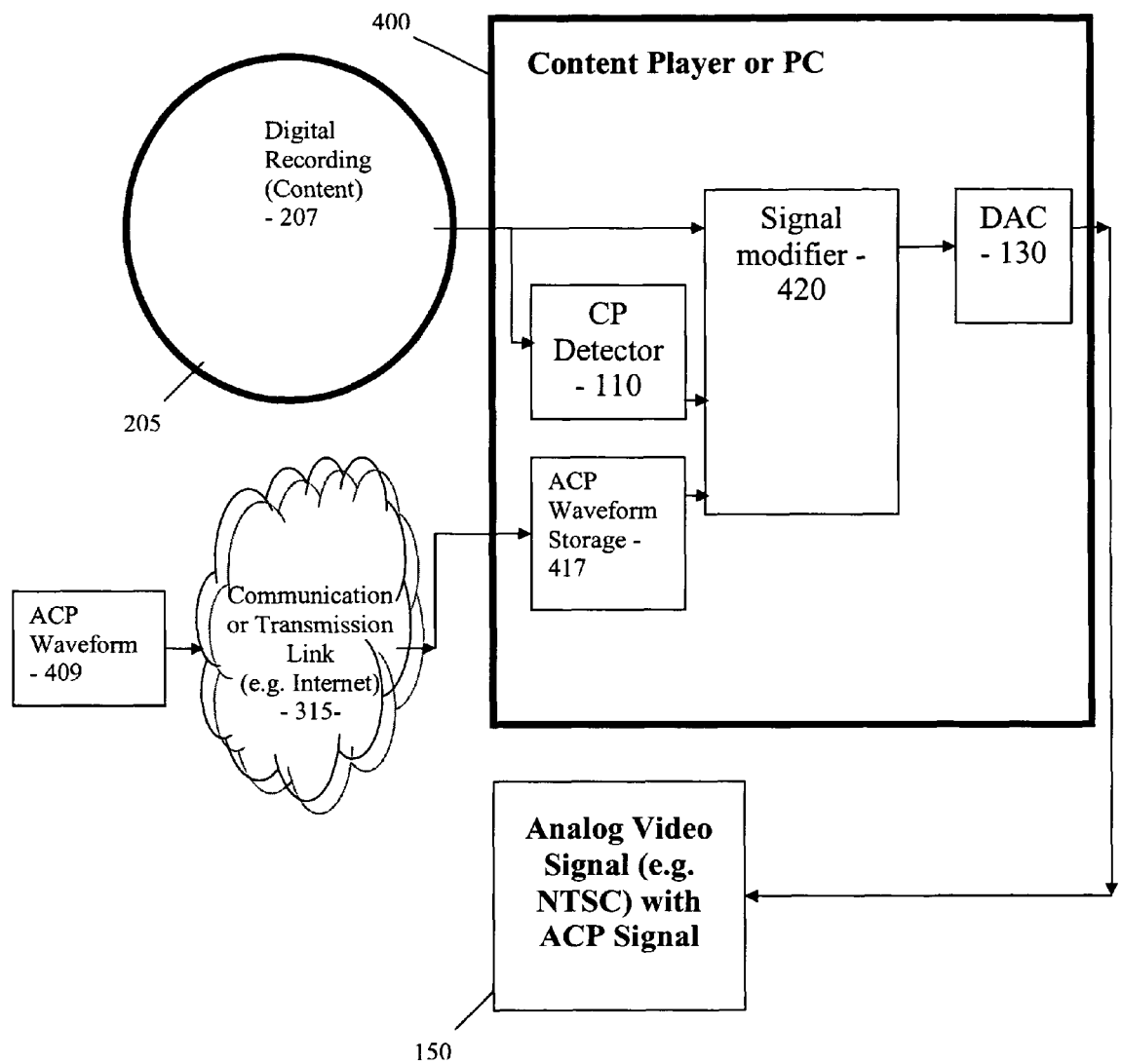
FIG. 4 is a block diagram of a system in accordance with a fourth embodiment.

Referring now to FIG. 4, another alternative embodiment is illustrated. As shown in FIG. 4, the embodiment includes a mechanism 400 for playing a digital recording medium 205. Similar to the implementation shown in FIG. 1, one example of such a mechanism is a DVD player or a personal computer. The recording medium 205 has stored thereon a digital content file 207. Similar to the embodiment shown in FIG. 3, the embodiment shown in FIG. 4 includes a copy protection file 409 stored remotely from the mechanism 400 and made accessible via a conventional network connection 315. In contrast to FIG. 3, the mechanism 400 includes a copy protection file storage component 417 to locally store a copy of the copy protection file 409 as received via a conventional network connection. In real-time or during a set-up initialization phase, mechanism 400 accesses the copy protection file 409 via a network connection 315 (e.g. the Internet). The obtained copy protection file 409 is stored locally in storage component 417 for later use by signal modifier 420. In the manner described above, the copy protection file 409 can be accessed from storage component 417 by the signal modifier 420 and used to modify the digital content signal in the manner described above in relation to FIG. 1. The copy protection file 409 can take any of the forms described above in relation to FIG. 1. The embodiment shown in FIG. 4 has the advantage that the copy protection file 409 can be remotely stored and thus updated more readily; yet, a copy of the copy protection file 409 can be obtained and stored locally in the mechanism 400 for better efficiency. In all other respects, the embodiment shown in FIG. 4 operates similarly to the embodiment shown in FIG. 1 and produces the modified analog output signal 150, if CP detector 110 detects the copy protection trigger in the digital content signal.

Figure 5:
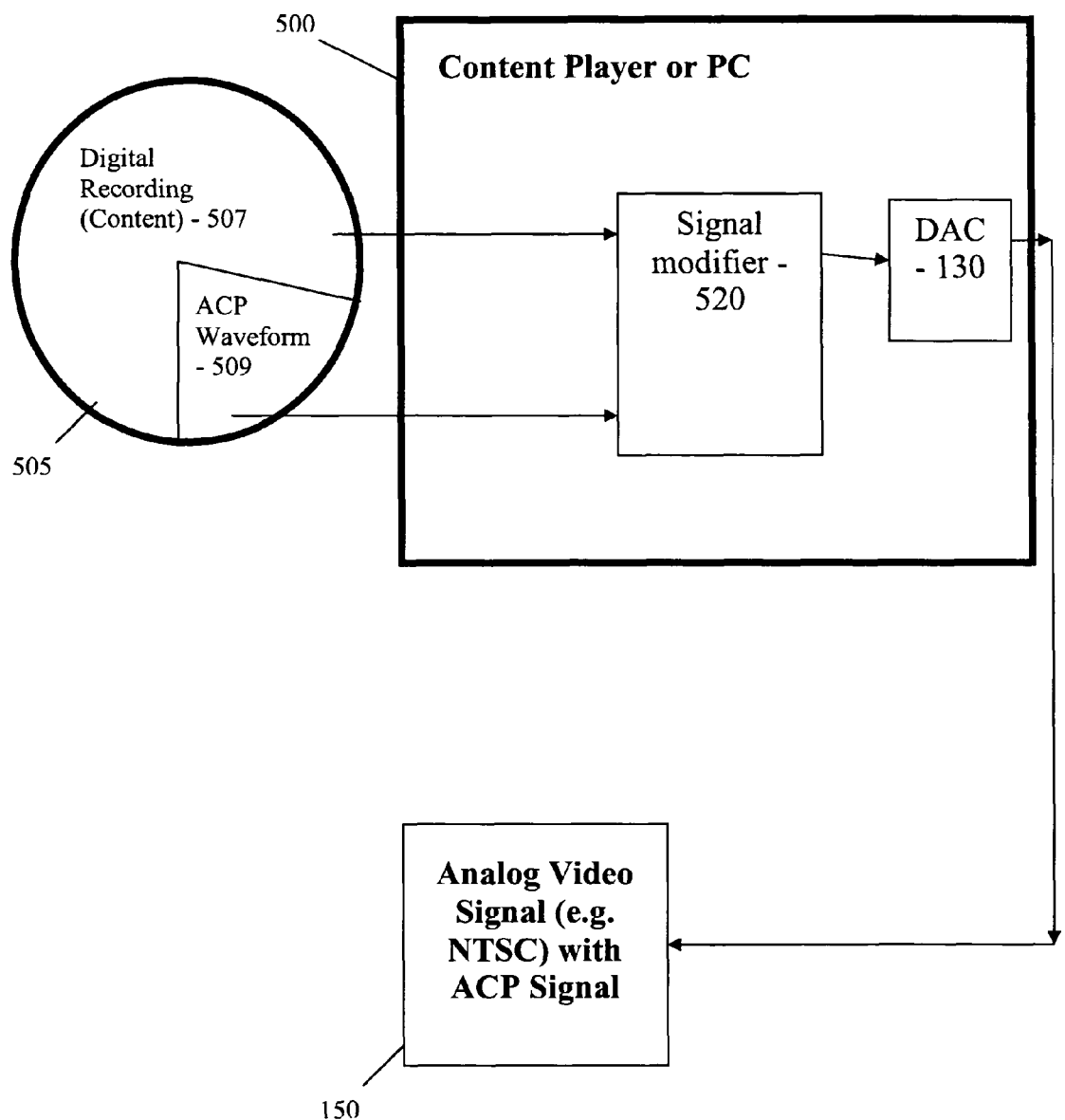
FIG. 5 is a block diagram of a system in accordance with a fifth embodiment.

Referring now to FIG. 5, another alternative embodiment is illustrated. As shown in FIG. 5, the embodiment includes a mechanism 500 for playing a digital recording medium 505. Similar to the implementation shown in FIG. 1, one example of such a mechanism is a DVD player or a personal computer. The recording medium 505 has stored thereon a digital content file 507 and a copy protection information file 509. In contrast to the embodiment shown in FIG. 1, the mechanism 500 does not include a CP detector 110. In the embodiment shown in FIG. 5, the signal modifier 520 always applies the copy protection signal as an input to DAC 130. In this embodiment, there is no detection of a copy protection trigger in the digital content signal as in the embodiment shown in FIG. 1. Rather, the mechanism 500 always applies the copy protection process defined in the copy protection file 509 regardless of any trigger in the digital content. Because the particular copy protection process embodied in the copy protection file 509 can be configured for a particular class or type of digital content embodied in the digital content file 507, the selectable application of the copy protection signal is not required. In another embodiment, the copy protection process defined in the copy protection file 509 can be essentially null. By creating a null copy protection file 509, the modification of the analog output signal can be prevented in a manner similar to the result obtained when no copy protection trigger is detected in the digital content signal as in the embodiment of FIG. 1. Using any of various conventional means, the copy protection file 509 can be accessed by the signal modifier 520 and used to modify the digital content signal in the manner described above in relation to FIG. 1. The copy protection file 509 can take any of the forms described above in relation to FIG. 1. The embodiment shown in FIG. 5 has the advantage that the mechanism 500 contains fewer parts and thus is less expensive. In all other respects, the embodiment shown in FIG. 5 operates similarly to the embodiment shown in FIG. 1 and produces the modified analog output signal 150.

Figure 6:
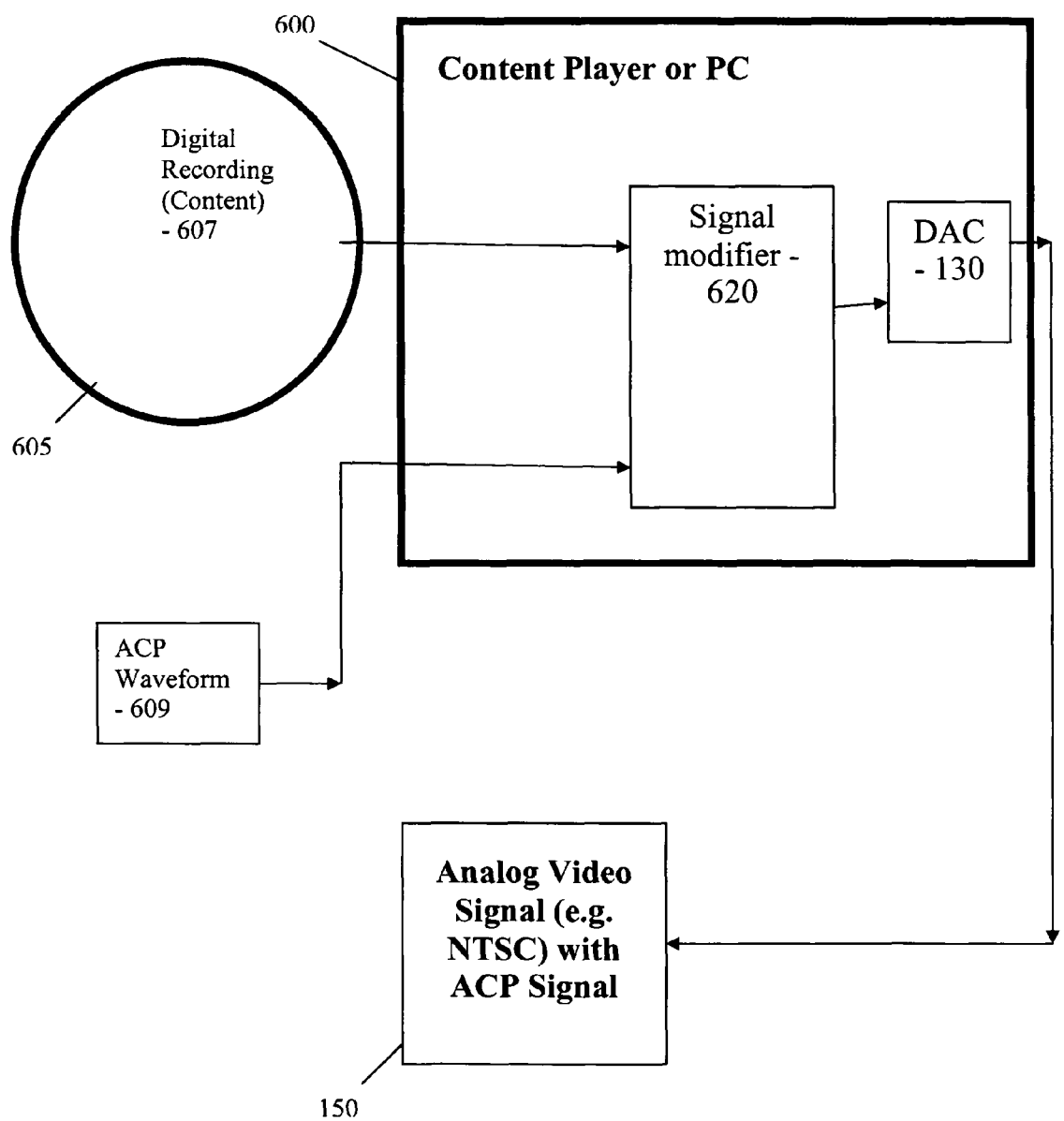
FIG. 6 is a block diagram of a system in accordance with a sixth embodiment.

Referring now to FIG. 6, another alternative embodiment is illustrated. As shown in FIG. 6, the embodiment includes a mechanism 600 for playing a digital recording medium 605. Similar to the implementation shown in FIG. 1, one example of such a mechanism is a DVD player or a personal computer. The recording medium 605 has stored thereon a digital content file 607. Similar to the embodiments shown in FIGS. 2-4, the copy protection file 609 is stored separately from digital media 605. In contrast to the embodiment shown in FIG. 1, the mechanism 600 does not include a CP detector 110. In the embodiment shown in FIG. 6, the signal modifier 620 always applies the copy protection signal as an input to DAC 130. In this embodiment and similar to the embodiment shown in FIG. 5, there is no detection of a copy protection trigger in the digital content signal as in the embodiment shown in FIG. 1. Rather, the mechanism 600 always applies the copy protection process defined in the copy protection file 609 regardless of any trigger in the digital content. Similar to the embodiments of FIGS. 2-4, the copy protection file 609 can be obtained from a separate memory device or via a network connection and used to modify the digital content signal in the manner described above in relation to FIG. 1. The copy protection file 609 can take any of the forms described above in relation to FIG. 1. The embodiment shown in FIG. 6 has the advantage that the mechanism 600 contains fewer parts and thus is less expensive and the digital media 605 does not need to be modified to retain the copy protection file 609. In all other respects, the embodiment shown in FIG. 6 operates similarly to the embodiment shown in FIG. 1 and produces the modified analog output signal 150.

Figure 7:
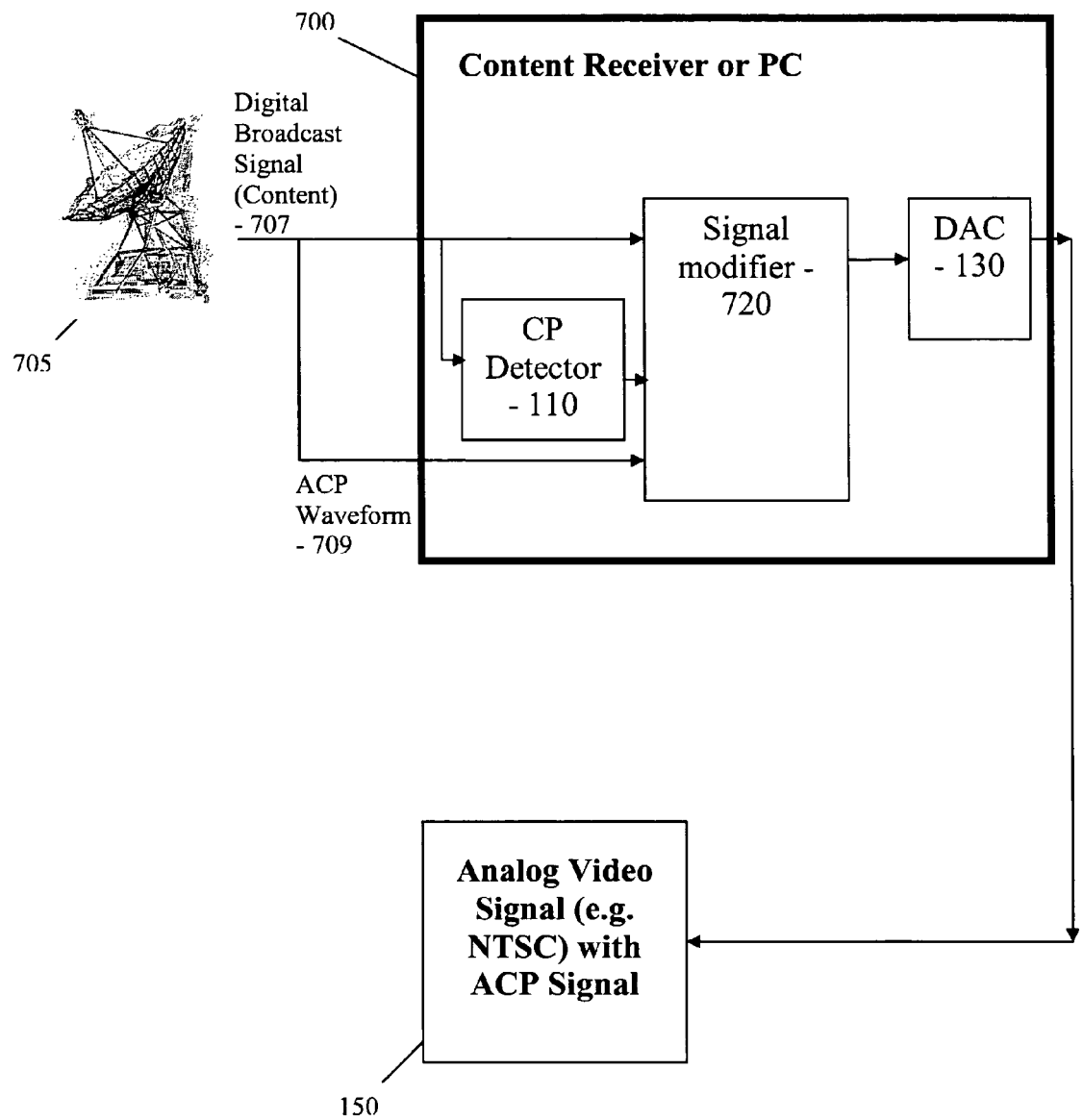
FIG. 7 is a block diagram of a system in accordance with a sixth embodiment.
Figure 8:
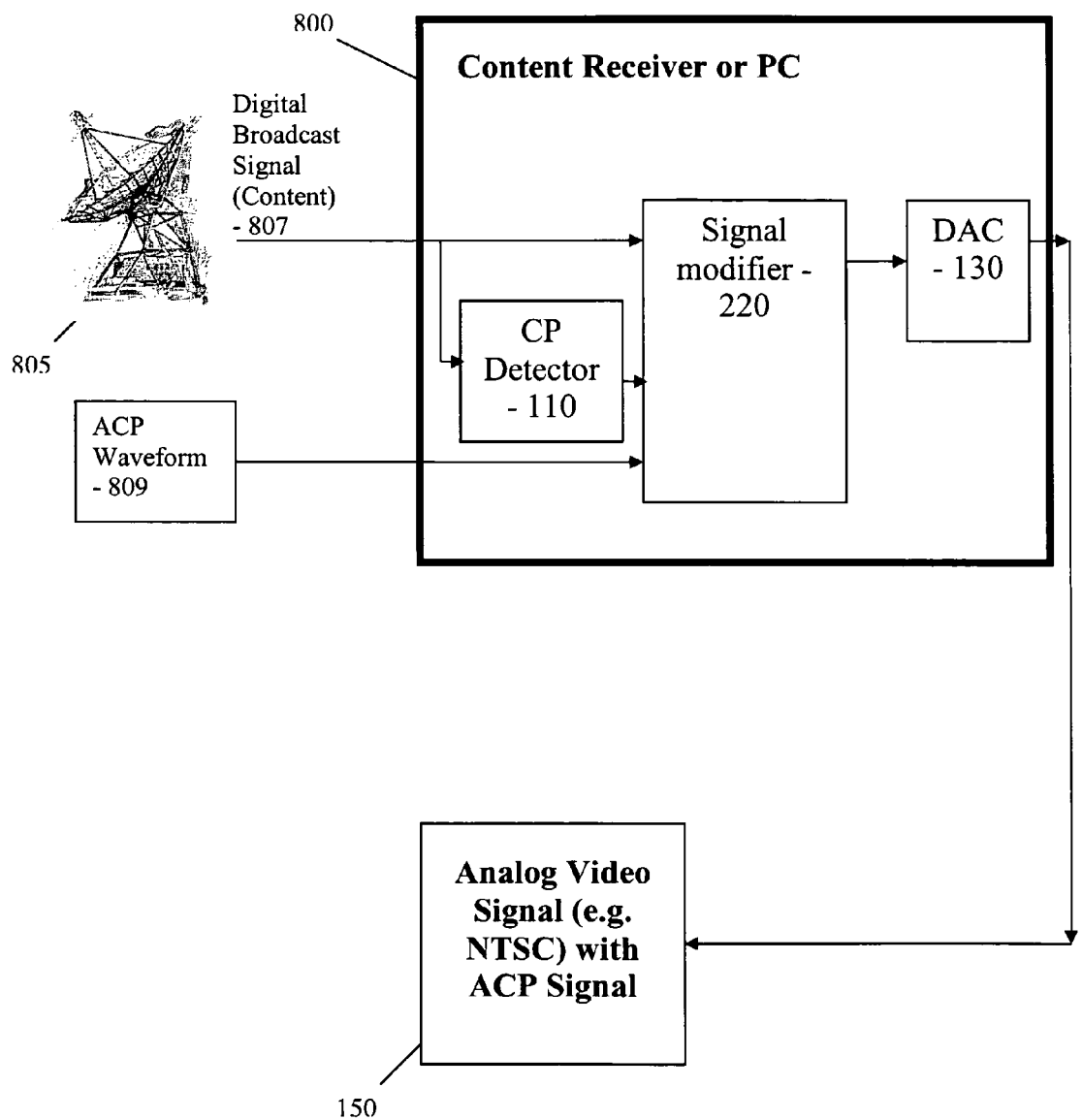
FIG. 8 is a block diagram of a system in accordance with a sixth embodiment.

As illustrated in FIGS. 7 and 8, the various embodiments illustrated in FIGS. 1-6 and described above can be implemented with systems that receive a video feed 705 from various sources, such as broadcast video programming, multicast, webcast, video-teleconferencing, and the like. As shown in FIG. 7, an alternative embodiment includes a mechanism 700 for receiving and rendering a broadcast digital signal 707 in which a copy protection signal 709 and a copy protection trigger is encoded. Similar to the implementation shown in FIG. 1, the signal modifier 720 receives both the broadcast digital signal 707 and the copy protection signal 709. As in the embodiment of FIG. 1, the broadcast digital signal 707 is also provided as an input to the Copy Protection (CP) detector 110. CP detector 110 decodes a copy protection trigger encoded into the broadcast digital signal 707. The '448 patent summarized above describes an implementation of a CP detector 110 for detecting copy protection trigger bits in a digital signal 707. The output of CP detector 110 is connected to the signal modifier 720. In this embodiment, signal modifier 720 is used to modify the broadcast digital signal 707 to selectively strip the copy protection signal 709 from the broadcast digital signal 707 prior to outputting the modified signal to DAC 130, if the CP detector 110 detects the absence of a copy protection trigger in the broadcast digital signal 707. If the CP detector 110 detects the presence of a copy protection trigger in the broadcast digital signal 707, the signal modifier 720 leaves the copy protection signal 709 intact and still encoded into the broadcast digital signal 707. The unmodified broadcast digital signal 707 is then sent to DAC 130 for conversion to the analog domain. This embodiment enables the selective stripping of the copy protection signal 709 from the broadcast digital signal 707. The embodiment also enables the copy protection signal 709 to be processed separately from the copy protection trigger upstream from the mechanism 700.

Referring to FIG. 8, another embodiment illustrates a system similar to the embodiment shown in FIG. 7 wherein the mechanism 800 receives a video feed 805 from various sources, such as broadcast video programming, multicast, webcast, video-teleconferencing, and the like. In contrast to FIG. 7, the mechanism 800 receives the broadcast digital signal 807 in which only a copy protection trigger is encoded. Unlike the embodiment of FIG. 7, the copy protection signal produced from copy protection information file 809 is not encoded into the broadcast digital signal 807. Rather, the copy protection information file 809 is stored separately on either a permanent or removable memory device accessible to mechanism 800. As described above, various conventional memory devices may be used to retain the copy protection information file 809. Similarly, as shown in FIGS. 3-4, the copy protection information file 809 can be obtained from a network accessible source. Using any of these various means, the copy protection information file 809 can be accessed by the signal modifier 220 and used to produce the copy protection signal and to modify the broadcast digital signal 807 in the manner described above in relation to FIGS. 1-6. The embodiment shown in FIG. 8 has the advantage that the source of the digital content can be from a broadcast, multicast, or webcast source. This embodiment might be used in a set-top box or a personal video recorder (PVR), for example. In all other respects, the embodiment shown in FIG. 8 operates similarly to the embodiments shown in FIGS. 1-6 and produces the modified analog output signal 150, if CP detector 110 detects the presence of the copy protection trigger in the broadcast digital signal 807.

Thus, a copy protection system and method enabling storage of copy protection information separately from protected content is disclosed. The above description is illustrative and not limiting; further modifications will be apparent to one of ordinary skill in the art in light of this disclosure.

We claim:

1. An apparatus, comprising:
   a mechanism for playing a recording medium, the recording medium having storable thereon a digital content file and a copy protection information file, the mechanism to produce a digital content signal from the digital content file and to obtain a copy protection signal comprising a digitized analog copy protection waveform including a pulse pair signal from the copy protection information file;
   a signal modifier to add the digitized analog copy protection waveform to the digital content signal to produce a modified digital content signal;
   a digital to analog converter to receive the modified digital content signal from the signal modifier and to produce a viewable copy protected analog signal having embedded therein an analog copy protection signal; and
   a copy protection detector, coupled to the mechanism, for detecting a copy protection trigger present in the digital content signal, wherein the signal modifier is coupled to the copy protection detector to enable the signal modifier to produce the modified digital content signal in response to the detection of the copy protection trigger in the digital content signal.

2. The apparatus of claim 1, wherein the digital content signal and the analog signal are video signals.

3. The apparatus of claim 1, wherein the copy protection signal is an anti-copy protection (ACP) waveform.

4. An apparatus, comprising:
   a mechanism for playing a recording medium, the recording medium having storable thereon a digital content file and a copy protection information file, the mechanism to produce a digital content signal from the digital content file and to obtain a copy protection signal comprising a digitized analog copy protection waveform including a pulse pair signal from the copy protection information file;
   a means for adding the digitized analog copy protection waveform to the digital content signal to produce a modified digital content signal;
   a means for receiving the modified digital content signal from the means for adding and for producing a viewable copy protected analog signal having embedded therein an analog copy protection signal; and
   a copy protection detection means, coupled to the mechanism, for detecting a copy protection trigger present in the digital content signal, wherein the means for adding is coupled to the copy protection detection means to enable the means for adding to produce the modified digital content signal in response to the detection of the copy protection trigger in the digital content signal.

5. The apparatus of claim 4, wherein the digital content signal and the analog signal are video signals.

6. The apparatus of claim 4, wherein the copy protection signal is an anti-copy protection (ACP) waveform.

7. A method, comprising:
   playing a recording medium, the recording medium having storable thereon a digital content file and a copy protection information file;
   producing a digital content signal from the digital content file and obtaining a copy protection signal comprising a digitized analog copy protection waveform including a pulse pair signal from the copy protection information file;

adding the digitized analog copy protection waveform to the digital content signal to produce a modified digital content signal;

producing a viewable copy protected analog signal from the modified digital content signal; and detecting a copy protection trigger present in the digital content signal and producing the viewable copy protected analog signal in response to the detection of the copy protection trigger in the digital content signal.

8. The method of claim 7, wherein the digital content signal and the analog signal are video signals.

9. The method of claim 7, wherein the copy protection signal is an anti-copy protection (ACP) waveform.

\* \* \* \* \*